Figure 7:
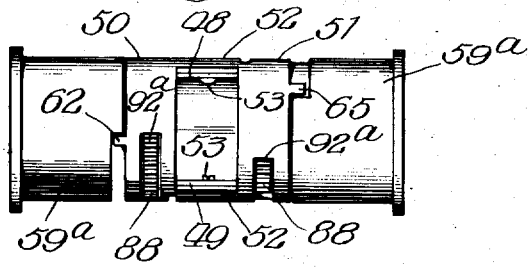

A. S. HOWELL.
PHOTOGRAPHIC PRINTING APPARATUS.
APPLICATION FILED SEPT. 25, 1919.
Reissued Feb. 3, 1920.
14,799.
4 SHEETS—SHEET 1.
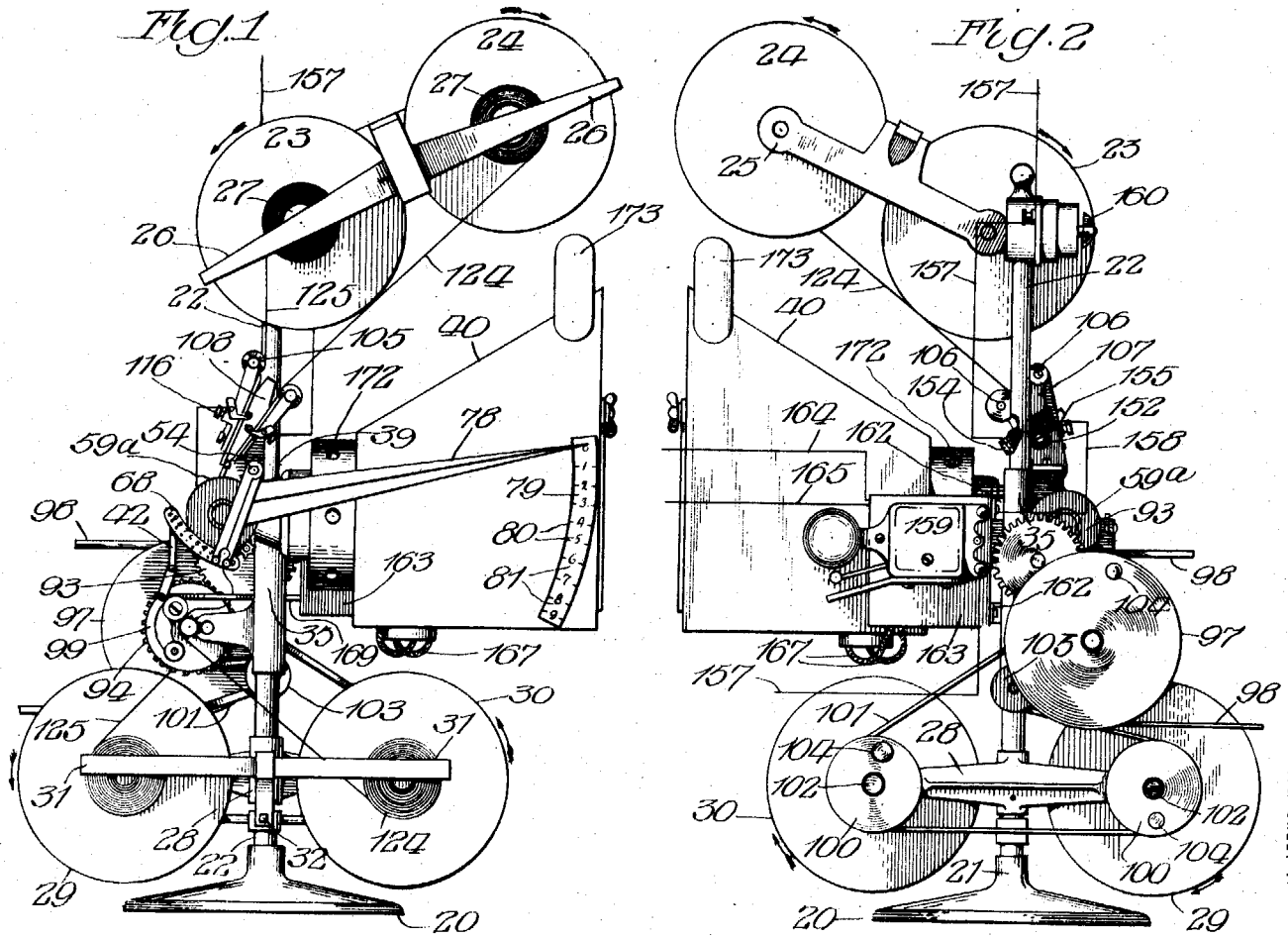
Inventor
Albert S. Howell,
By Miehle & Miehle,
Attys.

A. S. HOWELL.
PHOTOGRAPHIC PRINTING APPARATUS.
APPLICATION FILED SEPT. 25, 1919.
Reissued Feb. 3, 1920.
14,799.
4 SHEETS—SHEET 2.
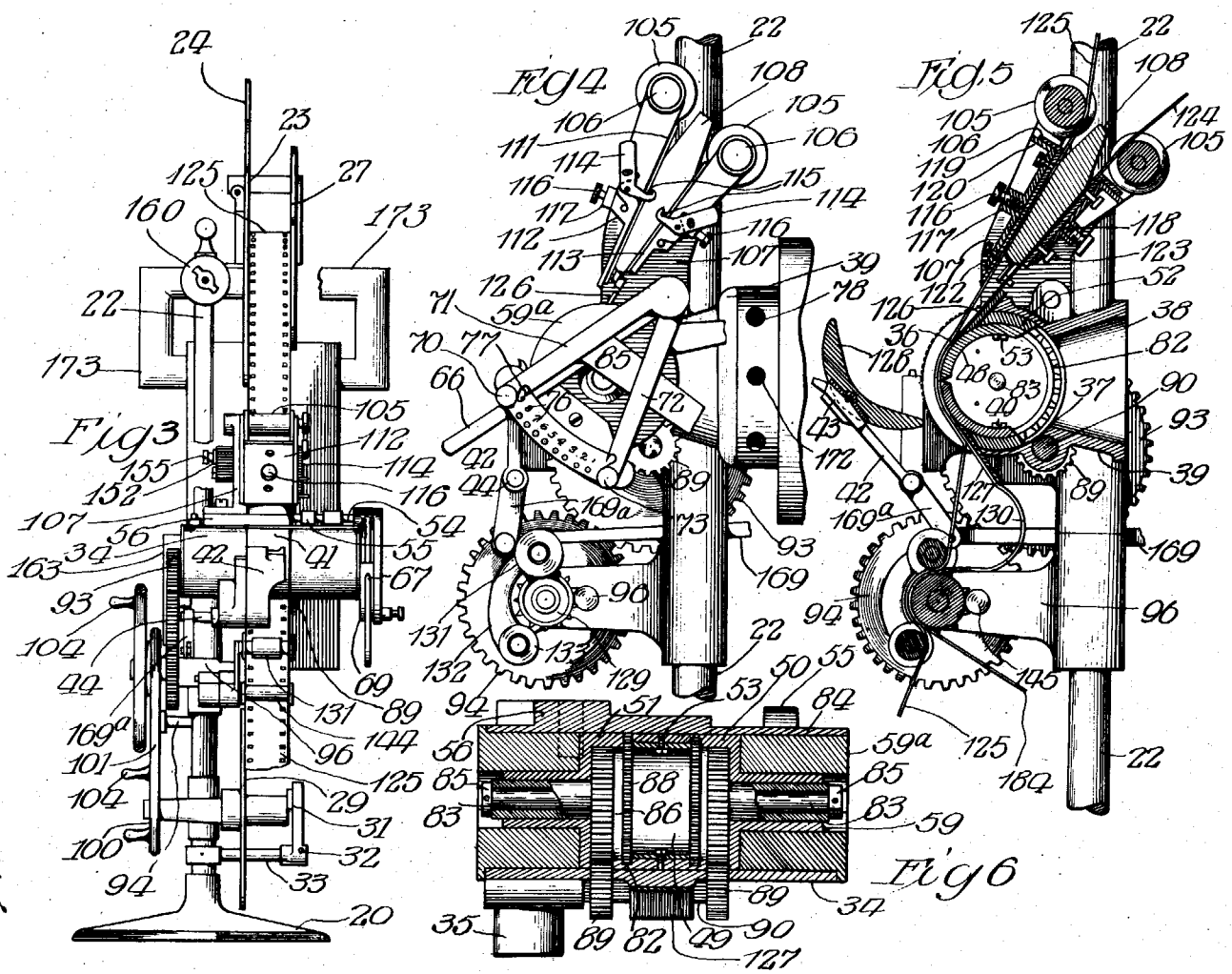
Inventor:
Albert S. Howell
By Miehle & Miehle
Attys.

A. S. HOWELL.

PHOTOGRAPHIC PRINTING APPARATUS.

APPLICATION FILED SEPT. 25, 1919.

Reissued Feb. 3, 1920.

14,799.

4 SHEETS—SHEET 3.

Inventor:
Albert S. Howell

By Miehle & Miehle,
Atty's

A. S. HOWELL.

PHOTOGRAPHIC PRINTING APPARATUS.

APPLICATION FILED SEPT. 25, 1919.

Reissued Feb. 3, 1920.

14,799.

4 SHEETS—SHEET 4.

Inventor
Albert S. Howell.

By Michler & Michler.
Attys

UNITED STATES PATENT OFFICE.

ALBERT S. HOWELL, OF CHICAGO, ILLINOIS, ASSIGNOR, BY DIRECT AND MESNE ASSIGNMENTS, TO BELL & HOWELL COMPANY, OF CHICAGO, ILLINOIS, A CORPORATION OF ILLINOIS.

PHOTOGRAPHIC-PRINTING APPARATUS.

14,799. Specification of Reissued Letters Patent. Reissued Feb. 3, 1920.

Original No. 1,056,794, dated March 25, 1913, Serial No. 481,582, filed March 6, 1909. Reissue No. 14,023, dated November 30, 1915, Serial No. 14,559½, filed March 15, 1915. This application for reissue filed September 25, 1919. Serial No. 326,421.

*To all whom it may concern:*

Be it known that I, ALBERT S. HOWELL, a citizen of the United States, residing at Chicago, in the county of Cook and State of Illinois, have invented certain new and useful Improvements in Photographic-Printing Apparatus, of which the following is a specification.

My invention relates to photographic printing apparatus and has especial reference to devices for duplicating film used in motion picture machines.

The chief objects of the improvements which form the subject matter of this application are:—to provide a mechanism for photographically printing upon a continuous strip of prepared material; to furnish a film printing appliance that will operate while both negative and positive strips are fed through the printing chamber with a uniform and uninterrupted motion, and to produce an apparatus of the character stated so constructed as to eliminate the transparent backing for the strips of films heretofore employed in mechanism of this class, thus producing a free and unobstructed passage between the source of illumination and the negative film, avoiding the loss of intensity which follows the passage of the light rays through media having different refractive indexes, and as the full actinic action of the light is received by the exposed surfaces, positives of maximum excellence will be produced.

Other objects of my invention are to provide means for varying the quantity of the light beams during the printing process; to furnish an automatic signal device for the purpose of indicating the proper point of time at which any change in the quantity of light is to be made, and to arrange suitable stop devices in connection with graduation which will enable the operator to bring the quantity of light to a predetermined degree with speed and accuracy.

As a precautionary measure to prevent the exposure of the sensitized film to destructive rays when the conduit gate is in its open position, I provide an automatic current interrupter or switch, operable by said gate, and adapted to break the lamp circuit whenever the gate is opened.

Further objects are to provide suitable tensioning means for both negative and positive strips, and to arrange portions of the guiding mechanism upon centers thus permitting the guide channels to be opened so that the insertion of the films therein may be facilitated.

Figure 8:
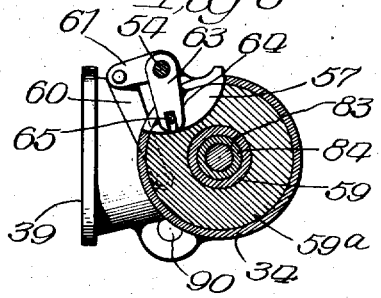
Figure 10:
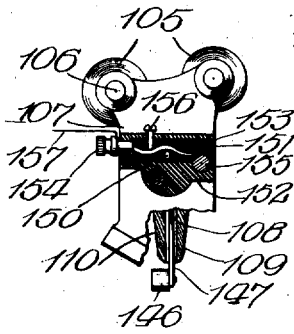
Figure 11:
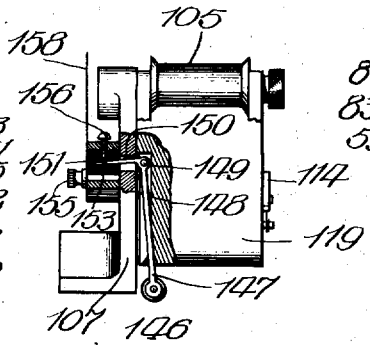
Figure 9:
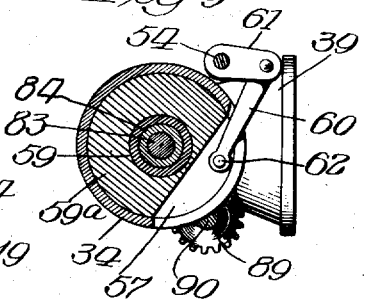
Figure 12:
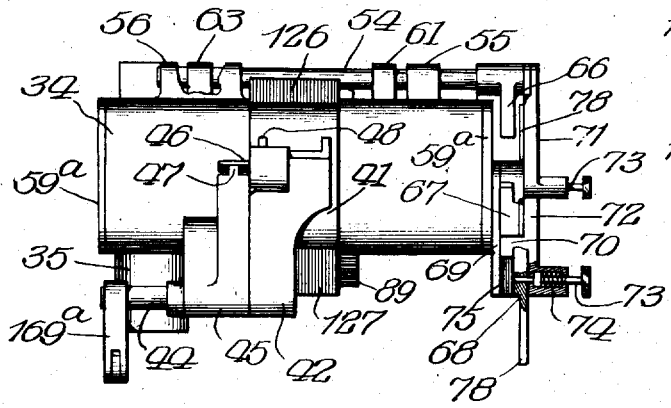
Figure 13:
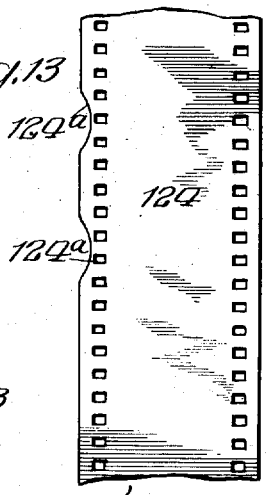
Figure 14:
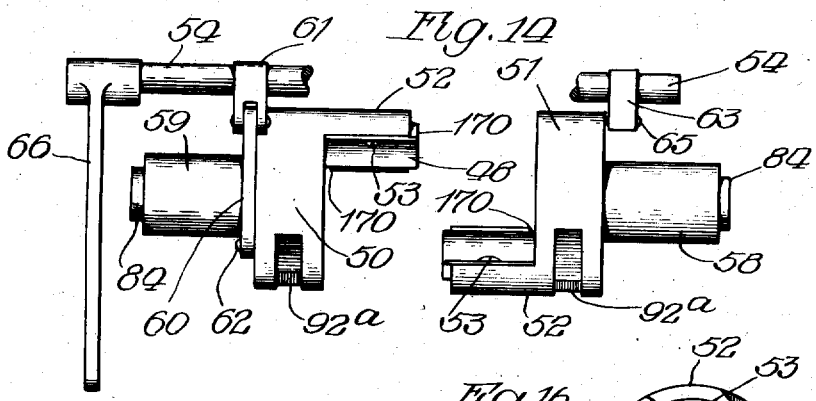
Figure 16:
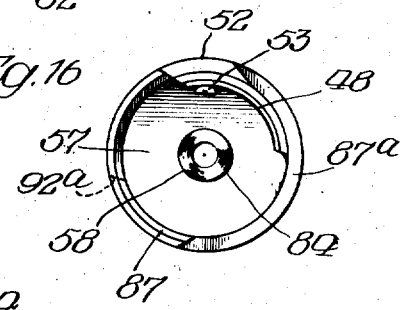
Figure 15:
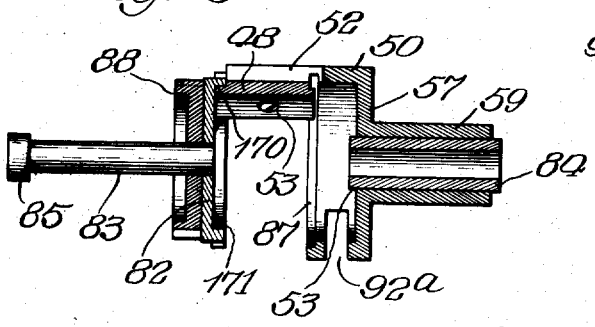
Figure 17:
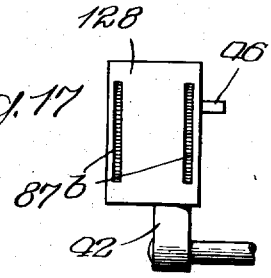
Figure 18:
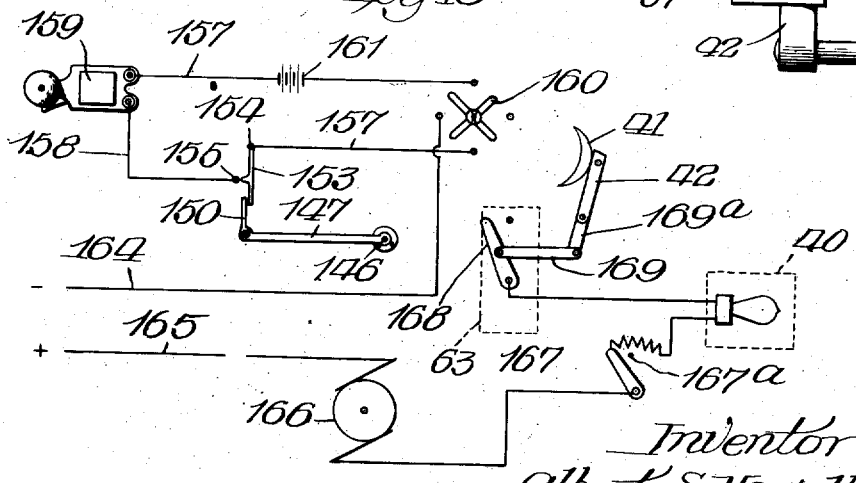

I accomplish the above and other important results by means of the apparatus illustrated in the accompanying drawings, which form a part of this application, the details of construction being disclosed in the following views:

Figure 1 is a side elevation of my improved photographic printing apparatus, viewed from the right; Fig. 2 is a similar view of the opposite side of the machine with the films removed; Fig. 3 is a front elevation; Fig. 4 is an enlarged view showing a portion of the mechanism in side elevation; Fig. 5 is a vertical median section of the mechanism shown in Fig. 4; Fig. 6 is a longitudinal section of the cylinder; Fig. 7 is a view of the cylinder seen from the rear and with the casing or shell removed; Fig. 8 is a transverse section of the cylinder, the cutting plane lying to the left of the median line; Fig. 9 is a view similar to Fig. 8, the plane cutting the cylinder upon the right of the median line; Figs. 10 and 11 are partial views showing the arrangement of the current interrupter; Fig. 12 is a front elevation of the cylinder and attachments; Fig. 13 is a plan view of a fragment of a negative film showing the notches for operating the interrupter; Fig. 14 is a rear elevation of the shutters and their mountings, showing manner of operating these devices from a single shaft; Fig. 15 is a partial view in section showing the left hand barrel and attached shutter in assembled relation with the right hand sprocket and gear, the parts being seen from the rear; Fig. 16 is a view of the inner end of the right hand barrel and attached shutter; Fig. 17 is a fragmentary view showing the inner or rear face of the conduit gate; and Fig. 18 is a diagram of the electric circuit and connected mechanism.

Referring to the details of the drawings, the numeral 20 indicates a foot piece or base, circular in shape, and having a socket 21 in which is fixed a cylindrical rod 22 of suitable length and diameter. This rod forms a standard or support upon which the entire operative mechanism is borne. To the upper portion of the said standard are attached a pair of film supply spools 23, 24, mounted on a bracket arm 25, and furnished with the usual hinged retaining arm or bar 26 for holding the rolls of prepared films in position on the hubs 27. At the lower part of the standard 22 is mounted a double armed bracket 28 carrying upon the opposite ends receiving spools 29, 30, the film rolls being removably secured on the hubs by a retaining bar 31, hinged at 32 to a horizontal arm 33 supported on the standard 22.

Situated between the upper or supply spools and the lower or receiving spools is a light passage formed by the inclosing walls of a cylindrical structure, hereinafter designated in its entirety as the cylinder. The cylinder is composed of a casing or shell 34, open at both ends and having a supporting sleeve 35 cast integral therewith and through which the standard 22 passes. Through the front and rear walls are substantially rectangular openings 36, 37, the rear opening 37 registering with a flaring passage 38, in a truncated cone shaped extension 39, formed integral with the casing or shell 34. The passage 38 communicates with the interior of a lamp chamber 40, supported upon said extension 39. Within this chamber is situated the source of the illumination employed in the printing process and I install for that purpose an ordinary electric lamp of sufficient power. As this lamp chamber forms no part of my invention its interior is not shown upon the drawings. The front opening 36 in the cylinder casing or shell is supplied with a closure or gate 41 having its outer and inner faces curved concentrically with the cylinder. This gate is hinged upon a support 42 the latter being supplied with ears 43 which enter suitable slots in the outer face of the gate. The gate has only a slight rocking movement on the ears 43, just sufficient to allow the gate to find its seat when closed without binding, or in other words to cause it to yield on its hinge so as to exert a uniform pressure with its inner or concave face when shut. The lower end of the support 42 is fixed on a shaft 44 journaled in a bracket 45 attached to the shell 34 which allows the gate and support to be thrown open. This gate or door 41 fits light tight in the said shell and is secured in closed position by a pin or lug 46 which engages a spring-held latch 47. In addition to the gate the said opening is furnished with cooperating shutters 48, 49, by means of which the area of said opening may be varied. These shutters are mounted on cylindrical barrels 50, 51, which lie within the cylinder shell upon opposite sides of the printing chamber. The barrel 50 situated upon the right, has a projection 52, to which the upper shutter 48 is secured by a screw 53, while the left hand barrel 51 has a similar projection 52 upon which the lower shutter 49 is mounted in the same way. The barrels 50, 51, are rotatable concentrically with the cylinder and are operated to a sufficient extent to approximate or separate said shutters to the required degree by a rock-shaft 54 mounted above and to the rear of the cylinders, journaled near its outer end in a box case 55 integral with the casing, and having its inner end supported in a projection 56, which also forms a support for a frame bracket hereinafter described. The outer end of each barrel is furnished with a plate or head 57 having a central opening 58, and provided with an extended sleeve 59, journaled in bushings or boxes 59[a], supported in each end of the cylinder casing. The right barrel 50 is supplied with an operating lever or link 60 which is pivoted at one end in an arm 61, fixed on the rock-shaft 54, and at the other engages a pin 62 fixed in the face of the head 57. As the barrels with their shutters move in opposite directions the left hand barrel 51 is operated directly from the said rock-shaft by means of an arm 63, having a slot 64 in the extremity to engage a pin 65 fixed in the head 57. The rock-shaft 54 is operated by means of a lever 66 attached to the outer end and extending downwardly across the end face of the cylinder. This lever plays in a slot 67 formed by the interval between two segmental plates 68, 69, attached to the end of the cylinder. It is desirable to be able to readily and accurately adjust the shutters relatively to each other, and for this purpose movable stops are provided which consist of lugs 70 extending into the path of the operating lever 66. These lugs are attached to arms 71, 72, pivotally mounted on the outer end of the rock-shaft 54 and provided with locking pins 73 yieldingly held by springs 74, and adapted to engage a series of spaced holes 75, in the outer segment plate 68. To facilitate the placing of these stops at predetermined points I provide an indicator consisting of numerals 76 which correspond with the holes 75, and upon each arm 71, 72, I place an index 77, which will point out the relative location of the lock pin 73. Since the apparatus is operated in a dark room I produce a magnification of the indicator by attaching to the arms 71, 72, elongated indexes or points 78, which extend back parallel with the side of the lamp chamber 40 and their extremities sweep over an indicator plate 79 conveniently supported on said chamber, suitably curved and supplied with graduations 80 and corresponding numerals 81.

Upon opposite sides of the illuminating passage and forming the side walls thereof are located sprocket wheels 82, mounted upon individual and separate shafts 83, which occupy the axis of the cylinder and extend to the cylinder ends. These shafts are journaled in bushings 84 which fit tightly in the sleeves 59, the shafts being retained in the bushings by collars 85. The bodies 86 of the sprockets 82 are approximately of the same diameter as the inner surface of the barrels 50, 51; their teeth, however, extend farther radially and occupy annular grooves or rabbets 87 formed in the interior surfaces of the said barrels. The overhanging portions of these rabbets are cut away in front as indicated at 87[a], Fig. 16, and their projecting points are let into grooves 87[b] (Fig. 17) formed in the inner face of the gate 41. There is a slight interval between the inner face of said gate and the outer face of the shutters, when the gate is in its closed position and this forms a suitable passage or conduit through which the films are led, and as the teeth of the sprocket wheels extend across this space in the manner described they will engage the apertures in said film when the latter are in contact between the gate and shutters.

Upon the sprocket shafts 83 are mounted gears 88 located adjacent the sprockets and these gears are actuated by pinions 89, carried by a shaft 90 arranged parallel with the sprocket shafts in the rear of the cylinder and journaled in boxes 91 formed integral with the cylinder casing, the said pinions projecting through suitable slots 92[a], in the casing and barrels. Upon one end of the shaft 90 is keyed a gear wheel 93, which receives motion from a similar gear 94, mounted on a driving shaft 95, journaled in a bracket 96, supported on the main standard 22. Upon the outer end of said driving shaft is mounted a grooved driving pulley 97, provided with a suitable belt 98 which connects with the motor supplying the power. Upon the said driving shaft 95 is mounted a grooved pulley 99 which by means of a belt 101 drives similar pulleys 100 mounted upon the shafts 102 of the negative and positive film receiving spools 29, 30, respectively, an idler 103 serving to give the proper direction to said belt to produce the required frictional contact with the pulleys. For the purpose of turning the train of pulleys thus described independently of the main source of power and of each other, suitable crank handles 104 are supplied.

In order to secure an accurate and efficient transmission of the superposed films or strips through the film passage between the said gate 41 and the shutters 48, 49, I provide guiding drums or spools 105, carried upon spindles 106, fixed in a frame piece 107, secured to the projection 56. To the face of said frame piece 107 and in alinement with the said film passage, is secured an inclined guide member 108, having its upper and lower faces 109, 110, (Fig. 10) slightly inclined to each other and arranged so as to be approximately tangent to the outer curvature of the shutters 48, 49. Arranged parallel with these faces 109, 110, are tension plates 111, (Fig. 4) supported by guide plates 112, 113, pivoted on the spindles 106, and locked in operative position by spring-held latches 114, which engage pins 115 on the edge of the guide member 108. The tension plates 111 exert pressure upon the films which travel between them and the corresponding faces 109, 110, of the inclined guide member 108, and this pressure is regulated in each instance by a thumb screw 116 mounted on a boss 117 formed integral with the guide plates 112, 113, and made yielding by a spiral spring 118 interposed between the point of said screw 116 and tension plate 111. Each plate 111 is held in position by a flange 119 formed on its upper margin and engaging the flanged edge 120 of the corresponding guide plate, and further secured by retaining lugs or screws 121 fixed in said plate 111 and passing loosely through apertures 122 in the guide plates, thus permitting a desirable amount of side and end play of the tensioning plates, the heads 123 of said lugs or screws preventing the plates from becoming displaced when the guide plates 112, 113, are turned upon their pivots 106. Referring to Fig. 5 it will be seen that the negative film 124 is led between the under tensioning plate 111 and the face 110, while the positive film 125 passes between the upper tensioning plate and the face 109, thus being separated by the guide member 108. After leaving the guide channels the films are brought into contact and pass in this relation between the gate 41, and the shutters 48, 49, their apertures registering so that the teeth of the sprockets 82 will engage both films.

It will be noted that the positive strip or film 125 occupies the outer position and the negative the inner. This relation of the films is necessary, since being made of celluloid, there will be an appreciable difference between the lengths of the respectice films, or, in other words, the distance between the apertures. This follows because the positive film has yet to undergo a chemical process which will cause a certain amount of shrinkage and allowance is made for this in order that the treated films may be of the proper dimensions. The radius of curvature of the external surface of the shutters, with which the negative film is in contact and over which it glides, and that of the inner surface of the gate 41 which is in contact with the positive film, are determinate quantities, the factors entering into their restriction being not only the difference between the lengths of the respective positive and negative films but also the actual thickness of the material of which the films are composed, to which must be added, in the case of the positive film, an increment due to the emulsion spread upon the surface. To give the best results the films must lie in a plane tangent to the curved surfaces as it approaches the conduit and to insure this required direction deflecting plates 126, 127, are attached to the cylinder casing 34, above and below the points of entrance and exit of the films. The upper surfaces of these plates are arranged tangentially to the outer curvature of the shutters 48, 49, and properly deflect and guide the negative film, previous to its entrance and after it leaves the printing chamber or passage. In order to guide the positive film in the proper direction the end portions of the inner surface of the gate 41 are formed tangent to the remaining portion of the surface, as indicated at 128.

Arranged below the point of exit of the films from the printing chamber is a sprocket drum 129, mounted on the said shaft 95, and coöperating with the sprockets 82 in operating the films. As soon as the films leave the curved passage or conduit between the shutters 48 and 49 and gate 41 to assume a different curvature, or a right line, their apertures will no longer register and it will be impracticable to operate them by a single sprocket. In order to overcome this inability to register properly under the conditions stated, the films are separated as they leave the said curved passage and while the positive film is led straight to the coöperating sprocket 129, the negative is carried backward forming a redundant loop 130, shown in Fig. 5, and then brought forward to engage the said drum 129, where it is again in apposition with the positive film, in the same relation as when passing through the printing chamber, compensation being thus made by the loop 130 for the difference in the length of the films and permitting the proper registration of the film apertures. A retaining spool 131 mounted on an arm 132 prevents dislodgment of the films from the drum 129, and said arm is pivoted on a shaft 133 so that the spool 131 may be thrown back and out of contact with said films. Upon the end of the shaft 133 is mounted a guide spool or idler 144, to give the required direction to the films, which then go directly to their respective receiving spools 29, 30. To the rear of the sprocket 129 is mounted a roller 145 whose function is to prevent entanglement of either of the films with the teeth of said sprocket in case one of the films becomes broken or is parted from accident.

It is well understood that moving picture negatives require variations in the exposure during the printing process, since the same film may depict both interior and exterior views which require different degrees of lighting. In the usual form of machine intimation is given the operator of the required changes by means of tags or labels affixed to the films at some point where they may be easily observed, but in the case of the apparatus under consideration, the extreme rapidity with which the films travel renders it impossible for the operator to take proper cognizance of such indicating means. Some other provision must be made therefore, to signalize the changes required, and permit of the proper adjustment of the shutters which control the light aperture. To accomplish this in an efficient manner I have introduced an electro-magnetic signal apparatus, which is automatically operated by means of the negative film 124. This apparatus consists of a contact roller 146 (Figs. 10 and 11) mounted upon the longer arm of a bell-crank lever 147, and arranged to bear constantly against one margin of the negative film 124. The said lever 147 lies in a groove 148 in the guide member 108 and is pivoted at 149, its shorter arm 150 projecting through a hole in the frame piece 107 and entering a recess 151 in an insulating block 152, attached to the side of the frame piece 107. The said arm 150 engages a spring contact arm 153, which is attached to a binding post 154, its opposite end being free and normally lying in contact with a terminal 155. A screw 156 serves to regulate the tension of the spring contact 153. The roller 146 is engaged by the margin of the negative film 124 in such manner as to retract the lever 147 and thus hold the spring 153 out of contact with the terminal 155, keeping the current broken. At predetermined points corresponding with the required changes in the illumination the margin of said negative film is furnished with notches 124[a], which are of sufficient size to permit the roller to drop therein and permit the spring 153 to come in contact with the terminal 155, thus closing the circuit. From the terminals 154, 155, wires 157, 158, connect with an electromagnetic sounder 159, including in the circuit a snap switch 160 and a battery 161.

Mounted upon suitable brackets 162 supported on the main standard 22 is a terminal box 163, through which the main circuit wires are led. Referring to Fig. 2 and also to the diagram Fig. 18, the numerals 164, 165, indicate the main supply circuit, in which is included the motor 166, the light circuit being designated by 167. There are two switches which control the main circuit the said snap switch conveniently mounted upon the top of the standard 22 (Fig. 2) and an automatic switch 168 operated by a lever 169 attached at one end to an arm 169[a] fixed on the shaft 44 and at the other to the switch 168; thus the gate 41 cannot be opened without breaking the main circuit and thus simultaneously stopping the motor and extinguishing the light.

The margins of the shutters 48, 49, are rabbeted to form flanges 170 and the inner faces of the sprocket wheels 82 are chambered or recessed by counterboring as shown at 171, (Fig. 15), forming an overhanging rim carrying the teeth, and this rim is received in the rabbet of the adjacent shutter (Fig. 15) forming a light-tight joint which prevents any leakage of light to the printing chamber when the parts are assembled.

As a precaution against overheating of the films from the close proximity of the lamp chamber 40 the latter is provided with ventilating openings 172 and oppositely arranged ventilating flues 173, which permit a circulation of cool air and prevent any undue rise in the temperature in said chamber.

While I have shown and described mechanical means for varying the light aperture for the purpose of controlling the duration of the illumination to which the films are exposed at the printing point, the same result may be obtained in varying the intensity of the source of light itself. This may be done in a practical and efficient manner by introducing a rheostat 167[a] in the lamp circuit 167, such a device being illustrated diagrammatically in Fig. 18.

Having thus described in detail the construction of my improved film duplicating machine I will now give a general outline of the method of its operation.

The negative and positive films are placed upon their respective spools in the usual manner, and their ends carried through the guide channels, the guide plates 112, 113, being thrown away from the guide member 108 by loosening the catches 114, to permit the insertion of the films. The gate 41 is then opened and the films brought into apposition, and thus in contact, are made to engage the sprockets 82, and secured thereon by closure of the said gate, which is locked in position by the catch or latch 47. The next step is to carry the films over the auxiliary sprocket drum 129, the retaining spool 131 being turned back out of the way, care being taken to render the negative film sufficiently lax by the formation of a loop, in the manner described, to permit the necessary registration of the operative apertures in the films. The films are then secured by returning the retaining spool to its engaging position. During this process of threading the films, the latter are propelled as needed by turning the grooved pulleys by means of the crank handles 104. This assembling of the films is concluded by securing the end of each film to its respective receiving spool. The next step is to set the stop arms 71, 72, at predetermined points to regulate the needed amount of light. Thus, if the first portion of the film should require the shutters to be opened to approximately one half their extent and the remaining portion requires only half of the full amount of exposure, the arm 71 would be set so that the pointer or index corresponded with 5 on the scale, and the lever 66 carried to contact with the stop lug 70 on that arm. The other arm 72 would be placed half way between the graduations 2 and 3, and locked in this position by the pin 73. The apparatus being thus made ready, the operator starts the motor by turning the switch 160 and simultaneously therewith lights the lamp. The films will then travel through the printing chamber at a predetermined rate. No further action is required on the part of the operator until the first group of marginal notches in the negative film is reached. As the negative film is fed its margin, engaged by the roller 146, will hold the lever 147 in its retracted position so long as said margin is intact. As soon as one of the notches 124[a] reaches the said roller the latter, impelled by the spring 153, will fall therein and permit the said spring to make contact with the terminal 155 and thus complete the battery circuit, and sound the alarm, this being a signal for the operator to be ready to change the exposure, and at the second signal, caused by the second notch, the operator swings the lever 67 against the stop upon the arm 72. Should any more changes be required for that particular film, the arm 71 is then set to the required point. For instance, if the remaining portion of the film requires a full exposure, the arm 71 is swung to the limit of the segment, and upon receiving the proper signals, as before, the operator moves the lever 66 against the stop 70 on the said arm 71.

It will be noted that the receiving spools are operated by the belt 101 and since the movement of these spools must vary in proportion to the diameter of the film-rolls wound thereon the said belt is loosely mounted and so adjusted as to permit a desirable amount of slip whenever the tension upon the films reaches a certain degree, and this belt may be formed of some elastic material, such for instance, as a coiled steel wire, in order to afford the necessary lost motion.

Having thus described my invention what I claim is:

1. In a photographic printing apparatus, including a light conducting passage, means for causing films to travel through said passage in superposed relation, and means adapted to be operated by one of said films for automatically indicating the points on said films where the quantity of light is to be increased or diminished.

2. In a photographic printing aparatus, including a conduit for the passage of films and film feeding means, said conduit having one side removable and the opposite side formed of shutters, means for adjusting said shutters to vary the area of the opening effected thereby, and means for transmitting light to said shutters in varying quantities.

3. In a photographic printing apparatus, a curved conduit for the passage of films, film feeding means, a hinged closure for one side of said conduit, shutters manually adjustable concentrically with the axis of curvature of said conduit to vary the area of the opening effected thereby, and means for automatically indicating the adjustment of said shutters to control the light admitted to said conduit.

4. In a photographic printing apparatus, including a curved conduit for the passage of films in superposed relation, and means for feeding said films through said conduit, said conduit having one side hinged and the opposite side composed of adjustable shutters, means for adjusting the shutters to vary the area of the opening effected thereby, and means for indicating the relative positions of said shutters to control the light admitted to said conduit.

5. In a photographic printing apparatus, including a curved conduit for the passage of films, and film feeding means, said conduit having its outer wall removable and its inner wall composed of shutters, means for adjusting said shutters to vary the area of the opening effected thereby, and means for indicating the relative position of the shutters to control the light admitted to said conduit.

6. In a photographic printing apparatus, the combination of a conduit having a hinged gate forming one wall thereof, a pair of shutters forming the opposite wall of the conduit, means for relatively adjusting said shutters to vary the area of the opening effected thereby, means for indicating the relative position of the shutters, and means for indicating when predetermined portions of the films have been reached.

7. In a photographic printing apparatus, the combination of a curved conduit for the passage of a positive and a negative film while in contact, means for feeding said films, shutters adapted to admit light to the conduit, means for adjusting said shutters to vary the area of the opening effected thereby, and means adapted to be operated by one of said films for indicating when predetermined portions of the films have been reached.

8. In a photographic printing apparatus, the combination of a conduit for the passage of a positive and a negative film while in contact, said conduit having a light admitting opening, means for feeding said films, said means comprising sprocket wheels engaging said films, film guide means arranged above said conduit, film tensioning means and an alarm device for the purpose set forth.

9. In a photographic printing apparatus, the combination of a conduit for the passage of a negative and a positive film while in contact, said conduit having a light opening, shutters controlling said opening, sprocket wheels engaging said films within said conduit, film guide means adjacent said conduit, film tensioning means arranged in said guide means and an auxiliary sprocket below the conduit adapted to engage said films.

10. In a photographic printing apparatus, including a source of illumination, the combination of means for continuously feeding a negative and a positive film, a conduit for the passage of said films, having a light opening therein, shutters controlling said opening, means for adjusting said shutters to vary the area of the opening effected thereby, means for indicating the relative position of the shutters, and means adapted to be operated by one of said films for indicating when predetermined portions of the films have been reached.

11. In a photographic printing apparatus, including a source of illumination, the combination of film feeding means, a conduit for the passage of film having a light aperture thereing, a shutter controlling said aperture, means for indicating the position of the shutter and electrically operated means cooperating with one of the films for automatically indicating when predetermined portions of the films have been reached.

12. In a photographic printing apparatus, including a source of illumination, film feeding mechanism, a conduit for the passage of a negative and a positive film while in contact, said conduit having a light aperture therein, film guide means, film tensioning means in said guide means, means adapted to be operated by one of the films for indicating when predetermined portions of the films have passed through said conduit, a gate forming one wall of the conduit, and means operated by said gate for controlling the source of illumination.

13. In a photographic printing apparatus, having a source of illumination, film feeding mechanism and a curved conduit for the passage of films, having a light aperture therein, the combination of shutters controlling said aperture, means for indicating the operating positions of said shutters, film-guiding means, film-tensioning means in said guide means, and means operated by one of said films for indicating when predetermined portions of the films have passed through said conduit.

14. In a photographic printing apparatus, including a motor, an electric circuit including said motor, a battery and a source of illumination, the combination of a conduit for the passage of a positive and a negative film while in contact, and having a light aperture therein, shutters controlling said aperture, and a circuit breaker adapted to be controlled by the negative film.

15. In a photographic printing apparatus, having a source of illumination, a motor, a source of electric energy, and an electric circuit including said motor and source of illumination, and the combination of a conduit for the passage of positive and negative films, and having a light aperture therein, a gate forming one wall of the conduit, shutters controlling the said aperture, means for indicating the relative position of the shutters, and means operated by said gate and one of said films for closing the electric circuit.

16. In a photographic printing apparatus, including a source of illumination, a motor, an electric circuit including a battery and a switch, the combination of film feeding means, a film conduit, a gate for the conduit, a circuit breaker adapted to be operated by one of the films, and means controlled by said gate for operating said switch.

17. In a photographic printing apparatus, the combination of a pair of film operating sprocket wheels, shafts for said wheels placed in alinement, a cylindrical illuminating chamber arranged between said sprockets, and film guides arranged tangentially to the peripheries of said sprockets.

18. In a photographic printing apparatus, having film operating means adapted to move a notched negative film, the combination of an indicating device, and means controlled by the notches in the negative film for operating said device.

19. In a photographic printing apparatus, the combination with film operating means, of a conduit for the passage of the films, said conduit having its central portion curved, and its ends extending tangentially to said curved portion.

20. In a photographic apparatus, including a source of illumination, the combination of a dark conduit for the passage of the films, means for controlling the admission of light to said conduit, a gate forming one side of the conduit, and means operated by said gate, for controlling the light supply.

21. In a photographic printing apparatus, including a motor, and a source of illumination, the combination of a dark conduit for the passage of the films while in contact, means for feeding the films, means for controlling the admission of light to said conduit, a gate forming one side of the conduit, and means operated by said gate for controlling the motor and the light supply.

22. In a photographic printing apparatus, a conduit for the passage of film having a light opening therein, means for moving film through said conduit, an electric circuit, devices for indicating the control of the operation of said machine operated by said circuit, and a circuit controlling device adapted to coact with a notched film during the transit of such film though said film passage whereby the action of said device is controlled.

23. In a photographic printing apparatus, a conduit for the passage of film adapted to receive a negative and a positive film and having a light opening therein, means for moving the film through said conduit, an electric circuit, devices for indicating the control of the operation of said machine operated by said circuit, and a device for closing said circuit adapted to coact with said negative film during the transit of such film through said film passage whereby the action of said device is controlled.

24. In a photographic printing apparatus, a conduit for the passage of a negative and a positive film and having a light opening therein, means for moving films through said conduit, and a movable member coacting with said negative film whereby the movement of said member is controlled.

25. In a photographic printing apparatus, a conduit for the passage of a negative and a positive film and having a light opening therein, means for moving films through said conduit, and a lever coacting with said negative film whereby the movement of said lever is controlled.

26. In a photographic printing apparatus, a conduit for the passage of film having a light opening therein, means for moving film through said conduit, an electric circuit, devices for indicating the control of the operation of said machine operated by said circuit, a pivoted circuit controlling device interposed in said circuit and a portion of which is disposed in the path of a film during the transit of such film through said film passage, whereby the action of said device is controlled.

27. In a photographic printing apparatus for printing from a negative film having views of different densities to produce a positive film of substantially uniform density throughout, said apparatus including means indicating a change in the density of the negative film and means for graduating the quantity of the light transmitted to said negative film.

28. In a photographic printing apparatus, a conduit for the passage of film and having a light opening therein, means for moving film through said conduit, an electric circuit, electro-responsive means in said circuit, and a circuit controlling device coacting with a notched film during the transit of such film through said film passage whereby the action of said device is controlled.

29. In a photographic printing apparatus, including a light conducting passage, means for causing films to travel through said passage in superposed relation, means adapted to be operated by one of said films for automatically indicating the points on said films where the quantity of light is to be increased or diminished, means for varying the quantity of light without interruption of the operation of the means for causing travel of the films, and means, controlling the light varying means, for predetermining the amount of variation in the quantity of light to be made by the light varying means.

30. In a photographic printing apparatus, having film operating means adapted to move a notched negative film, the combination of an indicating device, means controlled by the notches in the negative film for operating said device, a source of light, means for varying the quantity of light without interruption of the operation of the film operating means, and means, controlling the light varying means, for predetermining the amount of variation in the quantity of light to be made by the light varying means.

In witness whereof I hereunto affix my signature this fifth day of August, 1919 A. D.

ALBERT S. HOWELL.